(12) United States Patent
Prins et al.

(10) Patent No.: US 9,719,700 B2
(45) Date of Patent: Aug. 1, 2017

(54) METHOD FOR MATCHING REFRIGERATION LOAD TO COMPRESSOR CAPACITY

(71) Applicant: Danfoss A/S, Nordborg (DK)

(72) Inventors: Jans Prins, Nordborg (DK); Frede Schmidt, Soenderborg (DK); Torben Green, Aabenraa (DK)

(73) Assignee: Danfoss A/S, Nordborg (DK)

( * ) Notice: Subject to any disclaimer, the term of this patent is extended or adjusted under 35 U.S.C. 154(b) by 161 days.

(21) Appl. No.: 14/646,183

(22) PCT Filed: Nov. 18, 2013

(86) PCT No.: PCT/EP2013/074073
§ 371 (c)(1),
(2) Date: May 20, 2015

(87) PCT Pub. No.: WO2014/082888
PCT Pub. Date: Jun. 5, 2014

(65) Prior Publication Data
US 2015/0316297 A1 Nov. 5, 2015

(30) Foreign Application Priority Data
Nov. 30, 2012 (EP) .................................... 12008053

(51) Int. Cl.
*F25B 49/02* (2006.01)
*F25B 7/00* (2006.01)
(Continued)

(52) U.S. Cl.
CPC .................. *F25B 7/00* (2013.01); *F25B 5/02* (2013.01); *F25B 6/00* (2013.01); *F25B 49/02* (2013.01);
(Continued)

(58) Field of Classification Search
CPC .. F25B 49/02; F25B 49/022; F25B 2600/025; F25B 2600/0251; F25B 2600/0252;
(Continued)

(56) References Cited

U.S. PATENT DOCUMENTS 5,586,444 A * 12/1996 Fung ..................... F25B 49/022
                                                                    318/610
5,867,995 A    2/1999 Lewis
(Continued)

FOREIGN PATENT DOCUMENTS

CN      101142455 A    3/2008
EP       1980805 A1   10/2008

OTHER PUBLICATIONS

International Search Report for PCT Serial No. PCT/EP2013/074073 dated Jan. 27, 2014.

*Primary Examiner* — Jonathan Bradford
(74) *Attorney, Agent, or Firm* — McCormick, Paulding & Huber LLP

(57) ABSTRACT

A method for controlling operation of a refrigeration system (1), including one or more refrigeration entities (4), is disclosed. Each entity controller (7) obtains a measure for an error value between the measured value of a compressor control parameter and a setpoint value (8) for the compressor control parameter, and each entity controller (7) adjusts a refrigeration load of the corresponding refrigeration entity (4) to correspond to a cooling capacity of the compressor(s) (2), and in accordance with the obtained measure for an error value.

20 Claims, 3 Drawing Sheets

(51) Int. Cl.
*F25B 5/02* (2006.01)
*F25B 6/00* (2006.01)

(52) U.S. Cl.
CPC ...... *F25B 49/022* (2013.01); *F25B 2400/075* (2013.01); *F25B 2600/0251* (2013.01); *F25B 2600/0253* (2013.01); *F25B 2600/0272* (2013.01); *F25B 2600/2513* (2013.01); *F25B 2700/21172* (2013.01); *F25D 2600/06* (2013.01); *Y02B 30/741* (2013.01)

(58) Field of Classification Search
CPC ...... F25B 2600/0253; F25B 2600/0272; F25D 2600/00; F25D 2600/02; F25D 2600/04; F25D 2600/06
See application file for complete search history.

(56) References Cited

U.S. PATENT DOCUMENTS

| | | | |
|---|---|---|---|
| 7,207,184 B2 | 4/2007 | Jessen et al. | |
| 7,992,396 B2* | 8/2011 | Thybo | F25B 5/02 62/155 |
| 8,302,415 B2* | 11/2012 | Thybo | F25B 49/022 62/200 |
| 2002/0116938 A1 | 8/2002 | Uno et al. | |
| 2005/0252222 A1 | 11/2005 | Jessen et al. | |
| 2010/0024455 A1* | 2/2010 | Butorac | F25B 49/02 62/225 |
| 2011/0167853 A1* | 7/2011 | Kawaai | F25B 5/02 62/228.3 |

* cited by examiner

METHOD FOR MATCHING REFRIGERATION LOAD TO COMPRESSOR CAPACITY

CROSS-REFERENCE TO RELATED APPLICATION

This application is entitled to the benefit of and incorporates by reference subject matter disclosed in the International Patent Application No. PCT/EP2013/074073 filed on Nov. 18, 2013 and European Patent Application No. 12008053.6 filed Nov. 30, 2012.

FIELD OF THE INVENTION

The present invention relates to a method for controlling operation of a refrigeration system in such a manner that switching on and off of compressors is minimised.

BACKGROUND

Refrigeration systems normally comprise one or more compressors, one or more condensers and one or more refrigeration entities arranged in a refrigerant path. Each refrigeration entity comprises one or more evaporators and an expansion device arranged to provide a flow of refrigerant to the one or more evaporators. The evaporator(s) provide(s) refrigeration to a refrigerated volume, and the temperature inside the refrigerated volume can be controlled by allowing or preventing a refrigerant flow through the evaporator(s).

The refrigeration entities may, e.g., be cooling and/or freezing cabinets, e.g. of the kind applied in supermarkets.

In such refrigeration systems, the cooling capacity provided by the compressor(s) is normally adjusted in order to match the refrigeration load of the refrigeration entities. This may, e.g., be obtained by switching compressors on and off. However, switching a compressor repeatedly on and off results in wear on the compressor. It is therefore desirable to minimise the number of times the compressors are switched on and off.

EP 1 980 805 discloses a method for controlling a refrigeration system. The suction pressure is controlled to be within a predetermined suction pressure range by permitting or preventing flow of refrigerant into the evaporator of one or more refrigeration entities of the refrigeration system. The compressors are only switched on or off if the compressor capacity does not match a desired capacity level. In the method of EP 1 980 805 the control of the refrigeration entities is performed centrally. This will normally require a central control system, as well as appropriate programming of the central control system.

U.S. Pat. No. 5,867,995 discloses providing a suitable pressure to the evaporators. A distributed control unit, DCU, reports a required suction pressure to a compressor controller, which adjusts the compressors accordingly. In this manner, sub-loops of refrigeration cases achieve maximum efficiency while the compressors run at the highest possible suction pressure. Operation of the DCU includes, that when the refrigeration system is operating, each DCU periodically queries case controllers for information about the performance of corresponding electronic expansion valves, EEV. This information includes flow rate of the EEV, relationship of case temperature to a temperature set point, and relationship of a temperature difference, TD, set point to maximum and minimum TD values. If the DCU instructs the case controllers to change the EEV set points, the DCU informs the compressor controller of the new suction pressure requirement, as determined by a new saturated suction temperature, SST. If the new suction pressure requirement is lower than that currently provided by a compressor rack, the compressor controller alters the compressor settings to produce the reduced suction pressure requirement. If the new requirement is not lower than the current setting, the compressor controller takes no action. The DCU then continues to monitor EEV operation.

Providing a suitable pressure to the evaporators only affects the compressors in that it optimizes the suction pressure, which the compressor is designed to stabilize. Thus, the only effect on the compressor control is that the set point for the suction is influenced by the evaporator controllers. U.S. Pat. No. 5,867,995 does not disclose adjusting a refrigeration load, that is load of the refrigeration cases, to correspond to the cooling capacity of the compressors, for thereby reducing the number of starts and stops of compressors. U.S. Pat. No. 5,867,995 discloses the opposite, that is, adjusting the cooling capacity of the compressors to the refrigeration load.

SUMMARY

It is an object of embodiments of the invention to provide a method for controlling a refrigeration system, in which wear on the compressor(s) can be reduced without requiring a central control of the refrigeration entities.

It is a further object of embodiments of the invention to provide a method for controlling a refrigeration system which can be applied in a refrigeration system without a central control system.

According to a first aspect the invention provides a method for controlling operation of a refrigeration system, the refrigeration system comprising one or more compressors, one or more condensers, and one or more refrigeration entities, each refrigeration entity comprising one or more evaporators, an expansion device arranged to provide a flow of refrigerant into the one or more evaporators, an entity controller for controlling the expansion device, and a refrigerated volume for storing refrigerated goods, the refrigeration system further comprising a compressor controller for controlling operation of the compressor(s), the method comprising the steps of:

defining a setpoint value for a compressor control parameter, said compressor control parameter at least contributing to controlling, by means of the central controller, a cooling capacity provided by the compressor(s), measuring a value of the compressor control parameter, and the compressor controller controlling the compressor(s) on the basis of the value of the compressor control parameter and the defined setpoint value for the compressor control parameter, each entity controller obtaining a measure for an error value between the measured value of the compressor control parameter and the defined setpoint value for the compressor control parameter, and each entity controller adjusting a refrigeration load of the corresponding refrigeration entity to correspond to a cooling capacity of the compressor(s), and in accordance with the obtained measure for an error value.

The first aspect of the invention relates to a method for controlling a refrigeration system. In the present context the term 'refrigeration system' should be interpreted to mean a system in which refrigerant is alternatingly compressed and expanded in order to provide cooling or heating to one or more closed volumes. Thus, a refrigeration system normally comprises at least one compressor, at least one condenser, at least one expansion device and at least one evaporator arranged along a refrigerant path. If a closed volume is arranged at a condenser, the refrigeration system provides heating for the closed volume, and if a closed volume is arranged at an evaporator, the refrigeration system provides cooling for the closed volume. Thus, the refrigeration system may, e.g., be a chilling system, a freezing system, an air condition system or a heat pump.

The refrigeration system being controlled by means of the method of the invention comprises one or more refrigeration entities. In the present context the term 'refrigeration entity' should be interpreted to mean a location where refrigeration of products takes place. Thus, a refrigeration entity may be a display case, e.g. of the kind which is normally used in a supermarket for storing goods at a desired temperature. Alternatively, a refrigeration entity may be a larger entity, such as a closed refrigeration room, e.g. the kind which may be used in restaurants or a slaughterhouse.

The refrigeration system being controlled by means of the method of the invention preferably comprises two or more separate refrigeration entities.

Each refrigeration entity comprises one or more evaporators, an expansion device, an entity controller and a refrigerated volume for storing refrigerated goods. The refrigerated volume is arranged at the evaporator(s). The entity controller controls the refrigeration entity in the sense that it controls whether or not, and to what extent, refrigerant is supplied to the evaporator(s). Thereby a desired temperature is maintained in the refrigerated volume, and a desired superheat of refrigerant leaving the evaporator(s) is obtained in a known manner.

The expansion device expands the refrigerant immediately before it is supplied to the evaporator(s). The expansion device may, e.g., be in the form of an expansion valve. As an alternative, the expansion device may be or comprise an orifice or a capillary tube.

Each evaporator may comprise a single evaporator coil, or it may comprise two or more evaporator coils arranged in parallel.

The refrigeration system comprises one or more compressors, e.g. arranged in a compressor rack. Each compressor may be a fixed speed compressor or a variable speed compressor.

The refrigeration system further comprises a compressor controller for controlling operation of the compressor(s). Thus, the compressor controller controls switching on or off of the compressor(s), as well as adjusts the speed of the compressor(s) in the case that one or more compressors is/are variable speed compressor(s). The compressor controller may be or form part of a central controller which also controls other functions of the refrigeration system. As an alternative, the compressor controller may be used solely for controlling operation of the compressor(s).

According to the method of the first aspect of the invention, a setpoint value for a compressor control parameter is initially defined. The compressor control parameter is a parameter which is suitable as an input for controlling the cooling capacity provided by the compressor(s). The setpoint value for the compressor control parameter, thus, reflects a value of the compressor control parameter, which ensures that an appropriate and/or desired cooling capacity is provided by the compressor(s). The setpoint value for the compressor control parameter may be a fixed value. As an alternative, the setpoint value may vary in response to ambient conditions, such as ambient temperature, refrigeration load, time of day, etc. However, such variations will normally take place at a timescale which is significantly longer than typical variations in actually measured values of the compressor control parameter during normal operation of the refrigeration system.

In the present context the term 'cooling capacity provided by the compressor(s)' should be interpreted to mean the refrigeration system's ability to remove heat, under the given circumstances. More particularly, in the present context the cooling capacity reflects the compressors' ability to compress the refrigerant which enters the suction line from the evaporators of the refrigeration entities. This ability can be adjusted by switching compressors on or off, and/or by adjusting the speed of one or more variable speed compressors.

Next, a value of the compressor control parameter is measured, and the compressor controller controls the compressor(s) on the basis of the measured value of the compressor control parameter, and in order to reach the setpoint value for the compressor control parameter. The value of the compressor control parameter may, e.g., be measured by means of a suitable sensor or probe, such as a pressure sensor or a temperature sensor. When controlling the compressor(s), the compressor controller may, e.g., derive an error signal, expressing the difference between the measured value of the compressor control parameter and the setpoint value for the compressor control parameter. Thereby the compressor controller obtains information regarding how far the actual value of the compressor control parameter is from the desired setpoint value, as well as whether the actual value is too high or too low with respect to the setpoint value. This will allow the compressor controller to control the compressor(s) in order to increase or decrease the cooling capacity provided by the compressor(s), and by a suitable amount in order to approach the setpoint value.

Alternatively or additionally, the compressor controller may obtain information regarding the rate of change of the measured value of the compressor control parameter. Thereby the compressor controller obtains information regarding whether the measured compressor control parameter is increasing or decreasing, and at which speed.

Next, each entity controller obtains a measure for an error value between the measured value of the compressor control parameter and the defined setpoint value for the compressor control parameter. The obtained measure may be the actual error value, but it could, alternatively, be another value which reflects the error value, e.g. in terms of absolute value, rate of change, dynamical behaviour, etc. This will be described in further detail below. Thus, information regarding the error value between the measured value of the compressor control parameter and the defined setpoint value for the compressor control parameter is available at each entity controller.

Finally, each entity controller adjusts a refrigeration load of the corresponding refrigeration entity, i.e. the refrigeration entity which the entity controller forms part of. The refrigeration load is adjusted to correspond to the cooling capacity provided by the compressor(s), and it is adjusted in accordance with the obtained measure for the error value. The entity controller may adjust the refrigeration load by allowing or preventing a flow of refrigerant into the evaporator(s) of the refrigeration entity. When doing this it should, however, still be ensured that the temperature inside the refrigerated volume is maintained within an acceptable range, and that the superheat of refrigerant leaving the evaporator(s) is maintained at an acceptable level.

For instance, if the obtained measure for the error value indicates that the cooling capacity provided by the compressor(s) is larger than a cooling capacity which matches the refrigeration load of the refrigeration entities, then the entity controller will seek to increase the refrigeration load of the corresponding refrigeration entity, e.g. by allowing a flow of refrigerant through the evaporator(s) earlier than what is dictated by an ordinary hysteresis control. Similarly, if the obtained measure for the error value indicates that the cooling capacity provided by the compressor(s) is smaller than a cooling capacity which matches the refrigeration load of the refrigeration entities, then the entity controller will seek to decrease the refrigeration load of the corresponding refrigeration entity, e.g. by preventing a flow of refrigerant through the evaporator(s) earlier than what is dictated by an ordinary hysteresis control.

Accordingly, the refrigeration entities are controlled in such a manner that the refrigeration load of the refrigeration entities matches the cooling capacity of the compressor(s). Thereby adjustments of the cooling capacity provided by the compressor(s), and thereby switching on and off of compressors, are avoided to the greatest possible extent. Accordingly, wear on the compressor(s) is reduced.

It is an advantage that the information which is used for controlling the refrigeration entities as described above, i.e. the measure for the error value, is available locally at each entity controller, because it is thereby possible to perform the method of the first aspect of the invention in refrigeration systems which do not comprise a central control system. For instance, the method can be implemented in small refrigeration systems, and it can easily be implemented in existing refrigeration system, because no special programming of a central control system is required.

The step of each entity controller obtaining a measure for an error value between the measured value of the compressor control parameter and the setpoint value for the compressor control parameter may comprise the compressor controller providing information regarding the measured value of the compressor control parameter to each entity controller. According to this embodiment, the compressor controller communicates the relevant information to the entity controller(s). The information may, e.g. be the actual error value. Alternatively or additionally, the information may be or include the measured value of the compressor control parameter. In this case, the entity controller(s) will also require information regarding the setpoint value for the compressor control parameter. This may also be provided by the compressor controller. Alternatively or additionally, the information may be or include the rate of change of the measured compressor control parameter, the sign of the error value, the rate of change of the error value, and/or any other suitable information which may be useful in order to allow each entity controller to control the corresponding refrigeration entity in the manner described above.

As an alternative, the step of each entity controller obtaining a measure for an error value between the measured value of the compressor control parameter and the setpoint value for the compressor control parameter may comprise the step of:
  measuring a value of an entity control parameter at a position at or near the refrigeration entity, said entity control parameter correlating with the compressor control parameter used for controlling the compressor(s), and
  the entity controller deriving the measure for the error value from the measured value of the entity control parameter.

According to this embodiment, each entity controller obtains the required information regarding the error value between the measured value of the compressor control parameter and the setpoint value for the compressor control parameter, without having to communicate with the compressor controller or with any of the other entity controllers. This is an advantage, because it makes it very simple to implement the method in any refrigeration system, and no complex communication or wiring between controllers is required. Furthermore, the entity control parameter is measured locally, i.e. at a position at or near the refrigeration entity. Thereby it may be a control parameter which is already required in order to control the refrigeration entity. For instance, the entity control parameter may be the pressure of refrigerant leaving the evaporator(s) of the refrigeration entity. This pressure is often measured in order to obtain the superheat of the refrigerant leaving the evaporator(s). Thus, in this case no additional sensors or measuring electronics are required.

The entity control parameter correlates with the compressor control parameter used for controlling the compressor(s). This should be interpreted to mean that when the compressor control parameter varies, corresponding variations in the entity control parameter can be detected. For instance, the compressor control parameter may be the suction pressure, i.e. the pressure of refrigerant entering the compressor(s), and the entity control parameter may be the pressure of refrigerant leaving the evaporator(s) of the refrigeration entity. In this case the compressor control parameter as well as the entity control parameter reflects a pressure in the suction line of the refrigeration system. However, a pressure drop will normally occur in the suction line from the outlet opening(s) of the evaporator(s) to the inlet opening(s) of the compressor(s). Therefore, the pressure measured at the outlet opening(s) of the evaporator(s) will be offset with respect to the pressure measured at the inlet opening(s) of the compressor(s). The offset will be unknown, and it may even vary as a function of time. However, the variations in the two signals will be similar. Therefore, by measuring the pressure locally, at the outlet opening(s) of the evaporator(s), the entity controller can obtain information regarding how the suction pressure varies. From this information, the entity controller may derive information regarding the error value between the measured suction pressure and a suction pressure setpoint.

The step of the entity controller deriving the measure for the error value may comprise the steps of:
  deriving an average value of the value of the entity control parameter measured during a preceding time interval, and
  calculating the difference between the currently measured value of the entity control parameter and the derived average value.

According to this embodiment, it is assumed that the statistical average of the measured signal of the entity control parameter corresponds to the value of the entity control parameter when the compressor control parameter is at the setpoint value for the compressor control parameter. Thereby the difference between the currently measured value of the entity control parameter and the derived, statistical average will correspond to the difference between the current value of the compressor control parameter and the setpoint value for the compressor control parameter. Accordingly, this difference corresponds to the error value between the compressor control parameter and the setpoint value for the compressor control parameter, and thereby provides a measure for this error value.

Thus, according to this embodiment, a measure for the error value between the compressor control parameter and the setpoint value for the compressor control parameter is obtained locally, at each refrigeration entity, purely on the basis of local measurements, and without requiring any communication to the entity controller(s) regarding the measured compressor control parameter.

Alternatively or additionally, the step of the entity controller deriving the measure for the error value may comprise low pass filtering a measured signal of the value of the entity control parameter. For instance, the statistical average value of the value of the entity control parameter may be obtained by low pass filtering the measured signal.

The entity control parameter may be the pressure of refrigerant leaving the evaporator(s) of the refrigeration entity and/or the compressor control parameter used for controlling the compressor(s) may be the suction pressure of refrigerant entering the compressor(s). The suction pressure is known to be a suitable control parameter for controlling cooling capacity of a refrigeration system. The pressure of refrigerant leaving the evaporator(s) is often measured in order to obtain the superheat of refrigerant leaving the evaporator(s), and the supply of refrigerant to the evaporator(s) is often controlled in order to obtain an optimal superheat. Accordingly, the pressure of refrigerant leaving the evaporator(s) is often measured anyway. Furthermore, as described above, it is possible to derive information regarding the suction pressure from a measurement of the pressure of refrigerant leaving the evaporator(s), and it is therefore suitable to select this pressure as the entity control parameter.

As an alternative, the refrigeration system may further comprise a chiller, and the compressor control parameter used for controlling the compressor(s) may be the temperature of liquid entering one or more evaporators of the chiller, and/or the temperature of liquid leaving one or more evaporators of the chiller. In this case, a suitable entity control parameter could be the temperature of liquid entering and/or leaving a corresponding evaporator chiller.

According to one embodiment, each refrigeration entity may be controlled in order to maintain a temperature inside the refrigerated volume between a lower temperature limit and an upper temperature limit, and the method may further comprise the steps of:
  increasing the lower temperature limit in the case that the measure for the error value between the measured value of the compressor control parameter and the setpoint value for the compressor control parameter indicates that the refrigeration load of the refrigeration entities is larger than the cooling capacity of the compressor(s), and
  decreasing the upper temperature limit in the case that the measure for the error value between the measured value of the compressor control parameter and the setpoint value for the compressor control parameter indicates that the refrigeration load of the refrigeration entities is smaller than the cooling capacity of the compressor(s).

According to this embodiment, the refrigeration entities are controlled according to a normal hysteresis control strategy, i.e. in such a manner that the temperature inside the refrigerated volume is maintained within an acceptable temperature deadband defined by the lower temperature limit and the upper temperature limit. However, if it turns out that the refrigeration load of the refrigeration entities is larger than the cooling capacity of the compressor(s), then it is desirable to decrease the refrigeration load. Since this may be obtained by switching off a refrigeration entity earlier than the hysteresis control dictates, it is desirable to increase the lower limit of the temperature deadband, since this will result in the refrigeration entity being switched off at a higher temperature. The error value may, e.g., indicate that the refrigeration load of the refrigeration entities is larger than the cooling capacity of the compressor(s) if the error value is positive, and/or if the rate of change of the error value is large and positive.

Similarly, if it turns out that the refrigeration load of the refrigeration entities is smaller than the cooling capacity of the compressor(s), then it is desirable to increase the refrigeration load. Since this may be obtained by switching on a refrigeration entity earlier than the hysteresis control dictates, it is desirable to decrease the upper limit of the temperature deadband, since this will result in the refrigeration entity being switched on at a lower temperature. The error value may, e.g., indicate that the refrigeration load of the refrigeration entities is smaller than the cooling capacity of the compressor(s) if the error value is negative, and/or if the rate of change of the error value is large and negative.

As an alternative, each refrigeration entity may be controlled in order to obtain a temperature inside the refrigerated volume which is equal to a temperature setpoint value, and the method may further comprise the step of adjusting the temperature setpoint value in accordance with the obtained measure for the error value. The temperature setpoint may, e.g., be increased if the error value indicates that the refrigeration load of the refrigeration entities is larger than the cooling capacity provided by the compressor(s), and the temperature setpoint may be decreased if the error value indicates that the refrigeration load of the refrigeration entities is smaller than the cooling capacity provided by the compressor(s). This is similar to the embodiment described above.

According to a second aspect the invention provides a controller for a refrigeration system, said controller being capable of controlling at least one refrigeration entity of the refrigeration system, said refrigeration entity comprising one or more evaporators, an expansion device arranged to provide a flow of refrigerant into the one or more evaporators, and a refrigerated volume for storing refrigerated goods, said controller being capable of controlling the refrigeration entity by means of a method according to the first aspect of the invention.

According to a third embodiment the invention provides a refrigeration system comprising at least one refrigeration entity comprising a controller according to the second aspect of the invention.

It should be noted that a person skilled in the art would readily recognise that the remarks set forth above with reference to the first aspect of the invention are also applicable with respect to the second and third aspects of the invention.

BRIEF DESCRIPTION OF THE DRAWINGS

The invention will now be described in further detail with reference to the accompanying drawings in which.

DETAILED DESCRIPTION

Figure 1:
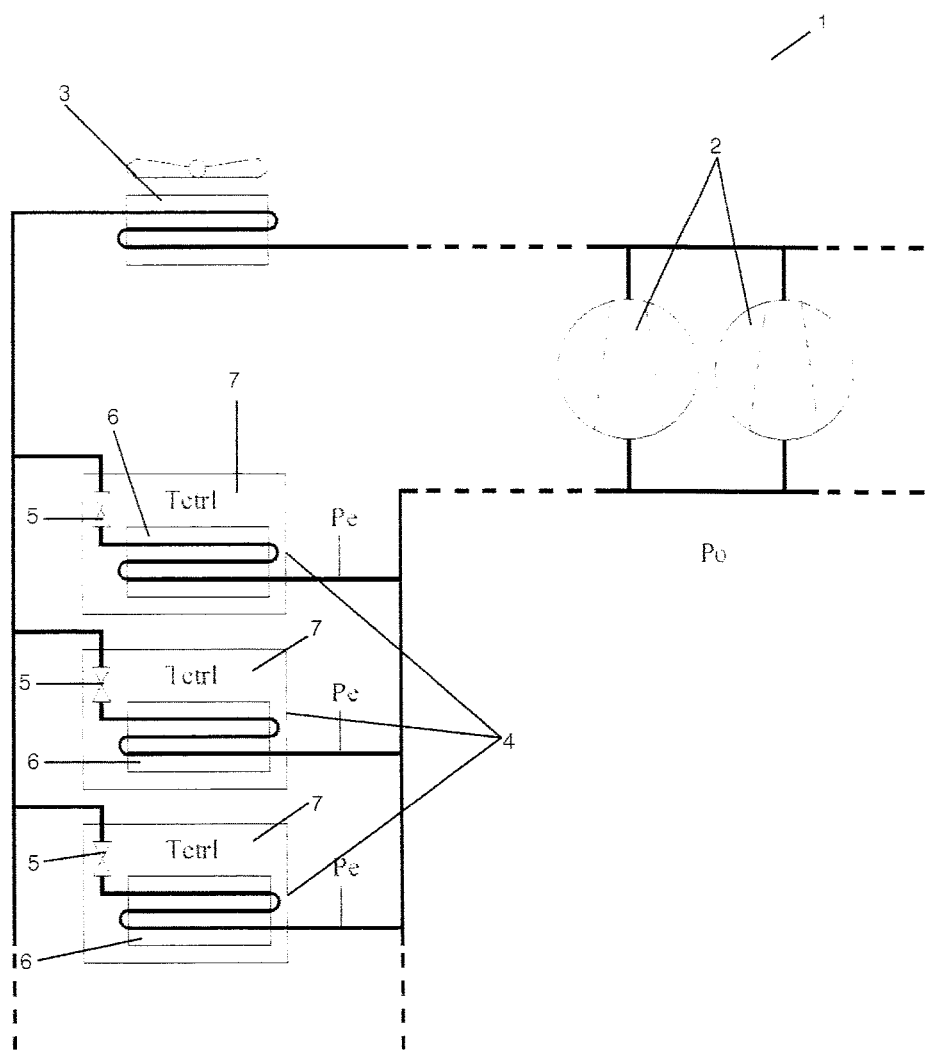
FIG. 1 is a diagrammatic view of a refrigeration system being controlled by means of a method according to an embodiment of the invention.

FIG. 1 is a diagrammatic view of a refrigeration system 1 being controlled by means of a method according to an embodiment of the invention. The refrigeration system 1 comprises a number of compressors 2, two of which are shown. The compressors 2 are arranged in a compressor rack. The refrigeration system 1 further comprises a condenser 3 and a number of refrigeration entities 4, three of which are shown.

Each refrigeration entity comprises an expansion device 5, an evaporator 6 and an entity controller 7. The entity controller 7 controls the corresponding refrigeration entity 4, including the supply of refrigerant to the evaporator 6.

The refrigeration system 1 may be operated in the following manner. Refrigerant is compressed in the compressors 2, then passed on to the condenser, where it is condensed and heat is rejected from the refrigerant, and further on towards the refrigeration entities 4. In the refrigeration entities, the refrigerant is expanded by means of the expansion device 5 and supplied to the evaporator 6. While passing through the evaporator 6, the refrigerant is at least partly evaporated, and heat exchange takes place with ambient air inside a closed, refrigerated volume, in such a manner that cooling is provided for the refrigerated volume.

In the refrigeration system 1 of FIG. 1, the suction pressure, $P_0$, is measured and used as a compressor control parameter for controlling a cooling capacity provided by the compressors 2. This may be done by deriving an error value being the difference between the measured suction pressure value and a setpoint value for the suction pressure. Based on the derived error value, compressors 2 are switched on or off in order to match the cooling capacity of the compressors 2 to the refrigeration load of the refrigeration entities 4.

Furthermore, the pressure, $P_e$, of refrigerant leaving the evaporator 6 of each refrigeration entity 4 is measured. The measured pressure, $P_e$, is supplied to the entity controller 7 of the relevant refrigeration entity 4, and is typically used during control of the opening degree of the expansion device 5 in order to obtain an optimal superheat value of refrigerant leaving the evaporator 6.

The entity controller 7 further analyses the measured values of the pressure, $P_e$, in order to obtain a measure for the error value between the measured suction pressure, $P_0$, and the setpoint value for the suction pressure. This may be done in the following manner.

It can be assumed that variations in the suction pressure, $P_0$, will result in corresponding variations in the pressure, $P_e$, of refrigerant leaving the evaporators 6 of the refrigeration entities 4, and thereby entering the suction line. Thus, the two pressure signals, $P_e$ and $P_0$, are correlated. It can further be assumed that there is a pressure drop through the suction line from the outlet openings of the evaporators 6 to the inlet openings of the compressors 2. Accordingly, it can be assumed that the pressure signal, $P_e$, is essentially an offset version of the suction pressure signal, $P_0$. However, it is not possible to obtain the offset value in an easy manner, and the offset value may even vary as a function of ambient conditions, such as outdoor temperature, time of day, refrigeration load, etc.

It may further be assumed that the statistical average of the pressure, $P_e$, of refrigerant leaving the evaporator 6 corresponds to the pressure of refrigerant leaving the evaporator 6, when the suction pressure, $P_0$, is equal to the setpoint value for the suction pressure. Therefore, deriving this statistical average, and measuring the difference between the currently measured pressure, $P_e$, and the statistical average, a measure for the error value between the measured suction pressure, $P_0$, and the setpoint value for the suction pressure is obtained.

Thus, in the manner described above, each entity controller 7 obtains a measure for the error value between the suction pressure, $P_0$, and the setpoint value for the suction pressure, purely by means of local measurements, and without requiring any communication between the compressor controller and the entity controller 7. This is an advantage.

Based on the obtained measure for the error value, each entity controller 7 controls the corresponding refrigeration entity 4 in order to match the refrigeration load of the refrigeration entities 4 to the cooling capacity provided by the compressors 2. This may be done by allowing or preventing a supply of refrigerant to the evaporators 6, slightly earlier than the normal hysteresis control would dictate. Thereby switching compressors 2 on and off is avoided to the greatest possible extent, and this can be obtained without requiring any communication between the compressor controller and the entity controllers 7.

Figure 2:
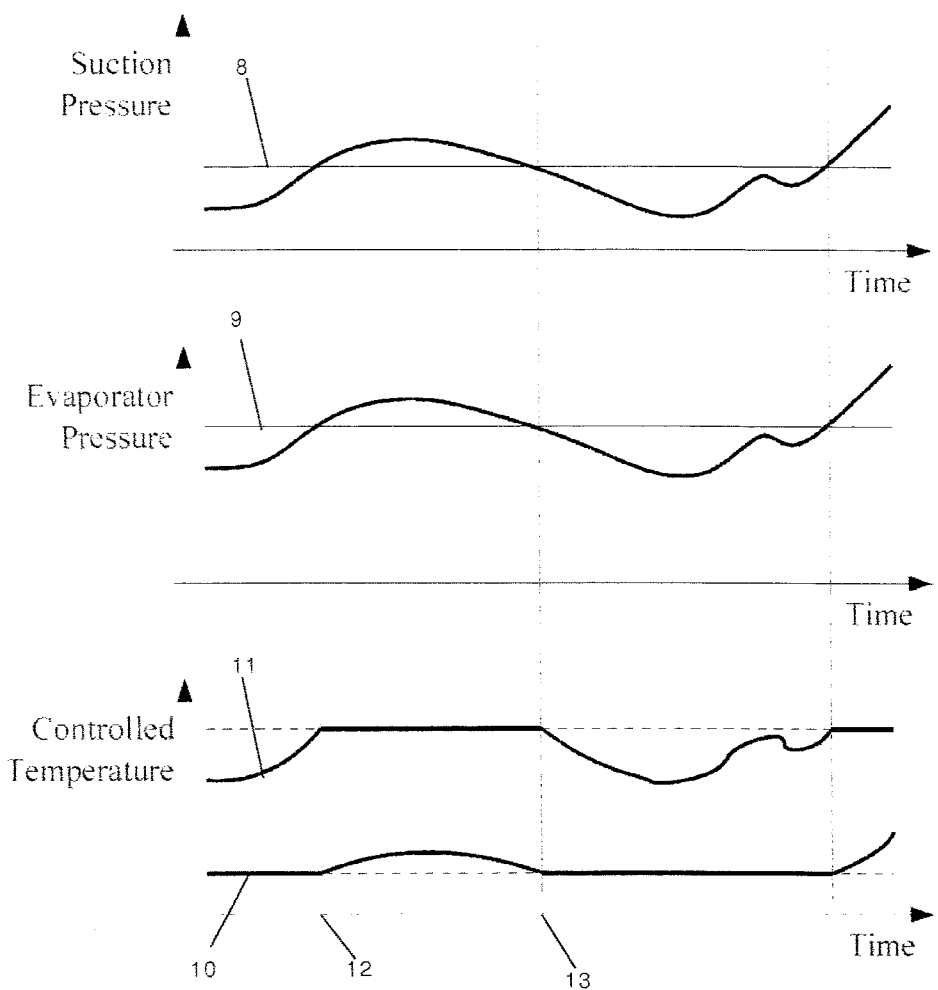
FIG. 2 illustrates corresponding values of suction pressure, evaporator pressure and temperature limits for temperature inside a refrigerated volume, in a refrigeration system being controlled by means of a method according to an embodiment of the invention.

FIG. 2 illustrates corresponding values of suction pressure, evaporator pressure and temperature limits for temperature inside a refrigerated volume, in a refrigeration system being controlled by means of a method according to an embodiment of the invention. It is clear from the graphs of FIG. 2 that the evaporator pressure, $P_e$, is simply an offset version of the suction pressure, $P_0$. A setpoint value 8 for the suction pressure is indicated in the uppermost graph, and an offset setpoint value 9 for the evaporator pressure is indicated in the middle graph.

The lowermost graph of FIG. 2 illustrates a lower temperature limit 10 and an upper temperature limit 11 for the temperature inside a refrigerated volume of a refrigeration entity, as a function of time. The dotted lines represent lower and upper temperature levels, respectively, which must not be exceeded. Thus, it must always be ensured that the temperature inside the refrigerated volume is within the temperature interval defined by the dotted lines.

Initially, the suction pressure is below the setpoint value 8 for the suction pressure, and consequently the evaporator pressure is also below the offset setpoint value 9. This indicates that the cooling capacity provided by the compressors is larger than the refrigeration load of the refrigeration entities. As a consequence, the upper temperature limit 11 has been lowered. This will have the effect that the refrigeration entity is switched on already when the temperature inside the refrigerated volume reaches the lowered temperature limit 11, rather than waiting until the temperature level of the upper dotted line is reached. This increases the refrigeration load, which may therefore be matched to the current cooling capacity provided by the compressors, and thereby the need to switch off a compressor is avoided.

At time 12 the suction pressure reaches the setpoint value 8 for the suction pressure, and the evaporator pressure reaches the offset setpoint value 9. This indicates that the cooling capacity provided by the compressors matches the refrigeration load of the refrigeration entities, and therefore the original upper temperature limit 11 is restored.

After time 12 the suction pressure, as well as the evaporator pressure, continues to increase, and the suction pressure is now above the setpoint value 8. This indicates that the cooling capacity provided by the compressors is smaller than the refrigeration load of the refrigeration entities. As a consequence, the lower temperature limit 10 is increased. This has the effect that the refrigeration entity is switched off already when the temperature inside the refrigerated volume reaches the increased temperature limit 10, rather than waiting until the temperature level of the lower dotted line is reached. This decreases the refrigeration load, which may therefore be matched to the current cooling capacity provided by the compressors, and thereby the need to switch on a compressor is avoided.

At time 13 the suction pressure once again reaches the setpoint value 8 for the suction pressure, the lower temperature limit 10 is returned to the level of the lower dotted line, and the upper temperature limit 11 is lowered, etc.

It can further be seen from the graphs of FIG. 2 that the amount by which the temperature limits 10, 11 are lowered or increased depends on the difference between the measured suction pressure and the setpoint value 8 for the suction pressure.

As described above, the entity controller is capable of controlling the lowering and increasing of the temperature limits 10, 11, solely on the basis of a measurement of the evaporator pressure, i.e. solely on the basis of local measurements.

Figure 3:
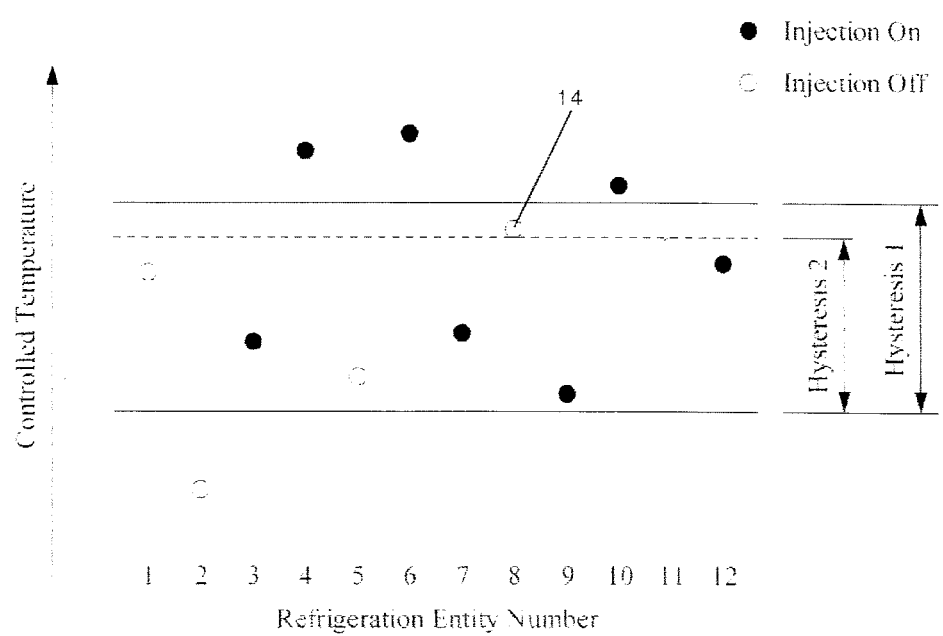
FIG. 3 illustrates temperatures inside refrigerated volumes of twelve refrigeration entities of a refrigeration system being controlled by means of a method according to an embodiment of the invention.

FIG. 3 illustrates temperatures inside refrigerated volumes of twelve refrigeration entities of a refrigeration system being controlled by means of a method according to an embodiment of the invention. The solid lines represent temperature limits corresponding to the dotted lines of FIG. 2. The dotted line represents a lowered upper temperature limit. Inside the refrigerated volume of refrigeration entity 14 the temperature is between the temperature level of the solid line and the temperature level of the dotted line. Therefore it should be switched on if the lowered upper temperature limit was applied, but it should not yet be switched on if the original upper temperature limit was applied.

Although various embodiments of the present invention have been described and shown, the invention is not restricted thereto, but may also be embodied in other ways within the scope of the subject-matter defined in the following claims.

What is claimed is:

1. A method for controlling operation of a refrigeration system, the refrigeration system comprising one or more compressors, one or more condensers, and one or more refrigeration entities, each refrigeration entity comprising one or more evaporators, an expansion device arranged to provide a flow of refrigerant into the one or more evaporators, an entity controller for controlling the expansion device, and a refrigerated volume for storing refrigerated goods, the refrigeration system further comprising a compressor controller for controlling operation of the compressor(s), the method comprising the steps of:
   defining a setpoint value for a compressor control parameter, said compressor control parameter at least contributing to controlling, by means of the compressor controller, a cooling capacity provided by the compressor(s),
   measuring a value of the compressor control parameter, and the compressor controller controlling the compressor(s) on the basis of the value of the compressor control parameter and the defined setpoint value for the compressor control parameter,
   each entity controller obtaining a measure for an error value between the measured value of the compressor control parameter and the defined setpoint value for the compressor control parameter, and
   each entity controller adjusting a refrigeration load of the corresponding refrigeration entity to correspond to a cooling capacity of the compressor(s), and in accordance with the obtained measure for an error value.

2. The method according to claim 1, wherein the step of each entity controller obtaining a measure for an error value between the measured value of the compressor control parameter and the setpoint value for the compressor control parameter comprises the compressor controller providing information regarding the measured value of the compressor control parameter to each entity controller.

3. The method according to claim 1, wherein the step of each entity controller obtaining a measure for an error value between the measured value of the compressor control parameter and the setpoint value for the compressor control parameter comprises the steps of:
   measuring a value of an entity control parameter at a position at the refrigeration entity, said entity control parameter correlating with the compressor control parameter used for controlling the compressor(s), and
   the entity controller deriving the measure for the error value from the measured value of the entity control parameter.

4. The method according to claim 3, wherein the step of the entity controller deriving the measure for the error value comprises the steps of:
   deriving an average value of the value of the entity control parameter measured during a preceding time interval, and
   calculating the difference between the currently measured value of the entity control parameter and the derived average value.

5. The method according to claim 3, wherein the step of the entity controller deriving the measure for the error value comprises low pass filtering a measured signal of the value of the entity control parameter.

6. The method according to claim 3, wherein the entity control parameter is the pressure of refrigerant leaving the evaporator(s) of the refrigeration entity.

7. The method according to claim 1, wherein the compressor control parameter used for controlling the compressor(s) is the suction pressure of refrigerant entering the compressor(s).

8. The method according to claim 1, wherein the refrigeration system further comprises a chiller, and wherein the compressor control parameter used for controlling the compressor(s) is the temperature of liquid entering one or more evaporators of the chiller, and/or the temperature of liquid leaving one or more evaporators of the chiller.

9. The method according to claim 1, wherein each refrigeration entity is controlled in order to maintain a temperature inside the refrigerated volume between a lower temperature limit and an upper temperature limit, and wherein the method further comprises the steps of:
   increasing the lower temperature limit in the case that the measure for the error value between the measured value of the compressor control parameter and the setpoint value for the compressor control parameter indicates that the refrigeration load of the refrigeration entities is larger than the cooling capacity of the compressor(s), and
   decreasing the upper temperature limit in the case that the measure for the error value between the measured value of the compressor control parameter and the setpoint value for the compressor control parameter indicates that the refrigeration load of the refrigeration entities is smaller than the cooling capacity of the compressor(s).

10. The method according to claim 1, wherein each refrigeration entity is controlled in order to obtain a temperature inside the refrigerated volume which is equal to a temperature setpoint value, and wherein the method further comprises the step of adjusting the temperature setpoint value in accordance with the obtained measure for the error value.

11. A controller for a refrigeration system, said controller being capable of controlling at least one refrigeration entity of the refrigeration system, said refrigeration entity comprising one or more evaporators, an expansion device arranged to provide a flow of refrigerant into the one or more evaporators, and a refrigerated volume for storing refrigerated goods, said controller being configured to control the refrigeration entity by means of the method according to claim 1.

12. A refrigeration system comprising at least one refrigeration entity comprising a controller according to claim 11.

13. The method according to claim 4, wherein the step of the entity controller deriving the measure for the error value comprises low pass filtering a measured signal of the value of the entity control parameter.

14. The method according to claim 4, wherein the entity control parameter is the pressure of refrigerant leaving the evaporator(s) of the refrigeration entity.

15. The method according to claim 5, wherein the entity control parameter is the pressure of refrigerant leaving the evaporator(s) of the refrigeration entity.

16. The method according to claim 2, wherein the compressor control parameter used for controlling the compressor(s) is the suction pressure of refrigerant entering the compressor(s).

17. The method according to claim 3, wherein the compressor control parameter used for controlling the compressor(s) is the suction pressure of refrigerant entering the compressor(s).

18. The method according to claim 4, wherein the compressor control parameter used for controlling the compressor(s) is the suction pressure of refrigerant entering the compressor(s).

19. The method according to claim 5, wherein the compressor control parameter used for controlling the compressor(s) is the suction pressure of refrigerant entering the compressor(s).

20. The method according to claim 6, wherein the compressor control parameter used for controlling the compressor(s) is the suction pressure of refrigerant entering the compressor(s).

\* \* \* \* \*